United States Patent
Hayashima et al.

(10) Patent No.: US 12,502,927 B2
(45) Date of Patent: Dec. 23, 2025

(54) CONTROL DEVICE FOR CONTROLLING AIR CONDITIONER ON A VEHICLE IN HIGH ALTITUDE

(71) Applicant: TOYOTA JIDOSHA KABUSHIKI KAISHA, Toyota (JP)

(72) Inventors: Naoki Hayashima, Toyota (JP); Yoshiaki Tsuruta, Nagakute (JP); Yoshio Hasegawa, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 210 days.

(21) Appl. No.: 18/366,165

(22) Filed: Aug. 7, 2023

(65) Prior Publication Data

US 2024/0123794 A1 Apr. 18, 2024

(30) Foreign Application Priority Data

Oct. 14, 2022 (JP) .................. 2022-165872

(51) Int. Cl.
*B60H 1/00* (2006.01)

(52) U.S. Cl.
CPC ..... *B60H 1/00771* (2013.01); *B60H 1/00428* (2013.01)

(58) Field of Classification Search
CPC .. B60H 1/00771; B60H 1/00428; Y02T 10/62
See application file for complete search history.

(56) References Cited

U.S. PATENT DOCUMENTS

| | | | |
|---|---|---|---|
| 6,205,379 B1 * | 3/2001 | Morisawa | B60L 50/16 180/165 |
| 2002/0084769 A1 * | 7/2002 | Iritani | B60H 1/3208 903/903 |
| 2020/0086849 A1 * | 3/2020 | Colavincenzo | B60L 1/02 |

FOREIGN PATENT DOCUMENTS

| | | | |
|---|---|---|---|
| JP | H10175429 A | * | 6/1998 |
| JP | 2002-262401 A | | 9/2002 |
| JP | 2010110188 A | * | 5/2010 |

* cited by examiner

*Primary Examiner* — Aniss Chad
*Assistant Examiner* — Nikki Marie M Molina
(74) *Attorney, Agent, or Firm* — SoraIP, Inc.

(57) ABSTRACT

A control device for a vehicle regulates air conditioner operation in high-altitude environments where engine output may be reduced. When the battery's state-of-charge (SOC) falls below a certain threshold, the device limits air conditioning capacity or suspends operation. If the SOC remains above the threshold, the normal air conditioning operation is maintained. This control helps preserve drive power and battery charge while maintaining cabin comfort.

7 Claims, 3 Drawing Sheets

CONTROL DEVICE FOR CONTROLLING AIR CONDITIONER ON A VEHICLE IN HIGH ALTITUDE

CROSS-REFERENCE TO RELATED APPLICATION

This application claims priority to Japanese Patent Application No. 2022-165872 filed on Oct. 14, 2022, incorporated herein by reference in its entirety.

BACKGROUND

Technical Field

The present disclosure relates to a control device for a vehicle including an engine, a rotary electric machine that is rotationally driven by the engine and generates electric power, and an air conditioner.

Description of Related Art

In a vehicle including a rotary electric machine that is rotationally driven by an engine and is capable of generating electric power, when the vehicle is in a high-altitude environment, an output of the engine is lowered, and thus charging of the battery may not be ensured. In such a case, a control device for a vehicle that stops the operation of an air conditioner is known. For example, that described in Japanese Unexamined Patent Application Publication No. 10-175429 (JP 10-175429 A) is an example of the above.

SUMMARY

In the control device for a vehicle described in JP 10-175429 A, the operation of the air conditioner may be stopped even though there is a margin in the state-of-charge value of the battery. In such a case, the air conditioner is unnecessarily stopped, which may impair the comfort in the vehicle cabin.

The present disclosure has been made in view of the above circumstances, and an object of the present disclosure is to provide a control device for a vehicle capable of suppressing a decrease in power performance and a decrease in comfort in a vehicle cabin in a high-altitude environment.

The gist of the present disclosure is a control device for a vehicle including an engine, a rotary electric machine that is rotationally driven by the engine and that generates electric power, and an air conditioner, and in a case where securing of a traveling drive force is prioritized over electric power generation by the rotary electric machine and the vehicle is in a predetermined high-altitude environment while the vehicle is traveling using the engine as a power source,
  (a) when a state-of-charge value of a battery charged by the electric power generated by the rotary electric machine is less than a predetermined first threshold value, an air conditioning capacity of the air conditioner is limited to less than a predetermined amount,
  (b) when the state-of-charge value is less than a predetermined second threshold value that is lower than the first threshold value, an operation of the air conditioner is stopped, and
  (c) when the state-of-charge value is equal to or greater than the first threshold value, the air conditioning capacity of the air conditioner is not limited.

According to the control device for a vehicle of the present disclosure, in a case where securing of a traveling drive force is prioritized over electric power generation by the rotary electric machine and the vehicle is in a predetermined high-altitude environment while the vehicle is traveling using the engine as a power source, (a) when a state-of-charge value of a battery charged by the electric power generated by the rotary electric machine is less than a predetermined first threshold value, an air conditioning capacity of the air conditioner is limited to less than a predetermined amount, (b) when the state-of-charge value is less than a predetermined second threshold value that is lower than the first threshold value, an operation of the air conditioner is stopped, and (c) when the state-of-charge value is equal to or greater than the first threshold value, the air conditioning capacity of the air conditioner is not limited. In a high-altitude environment, the air conditioning capacity of the air conditioner is not limited when the state-of-charge value has a margin. On the other hand, when there is no margin in the state-of-charge value of the battery, the air conditioning capacity of the air conditioner is limited or the operation is stopped. As described above, since the traveling drive force is secured and the air conditioning capacity of the air conditioner is limited or the operation is stopped only when it is necessary, deterioration of the power performance is suppressed and deterioration of the comfort in the vehicle cabin is also suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the drawings. Note that, in the following embodiments, the drawings are appropriately simplified or modified, and the dimensional ratios, shapes, and the like of the respective portions are not necessarily drawn accurately.

Example 1

Figure 1:
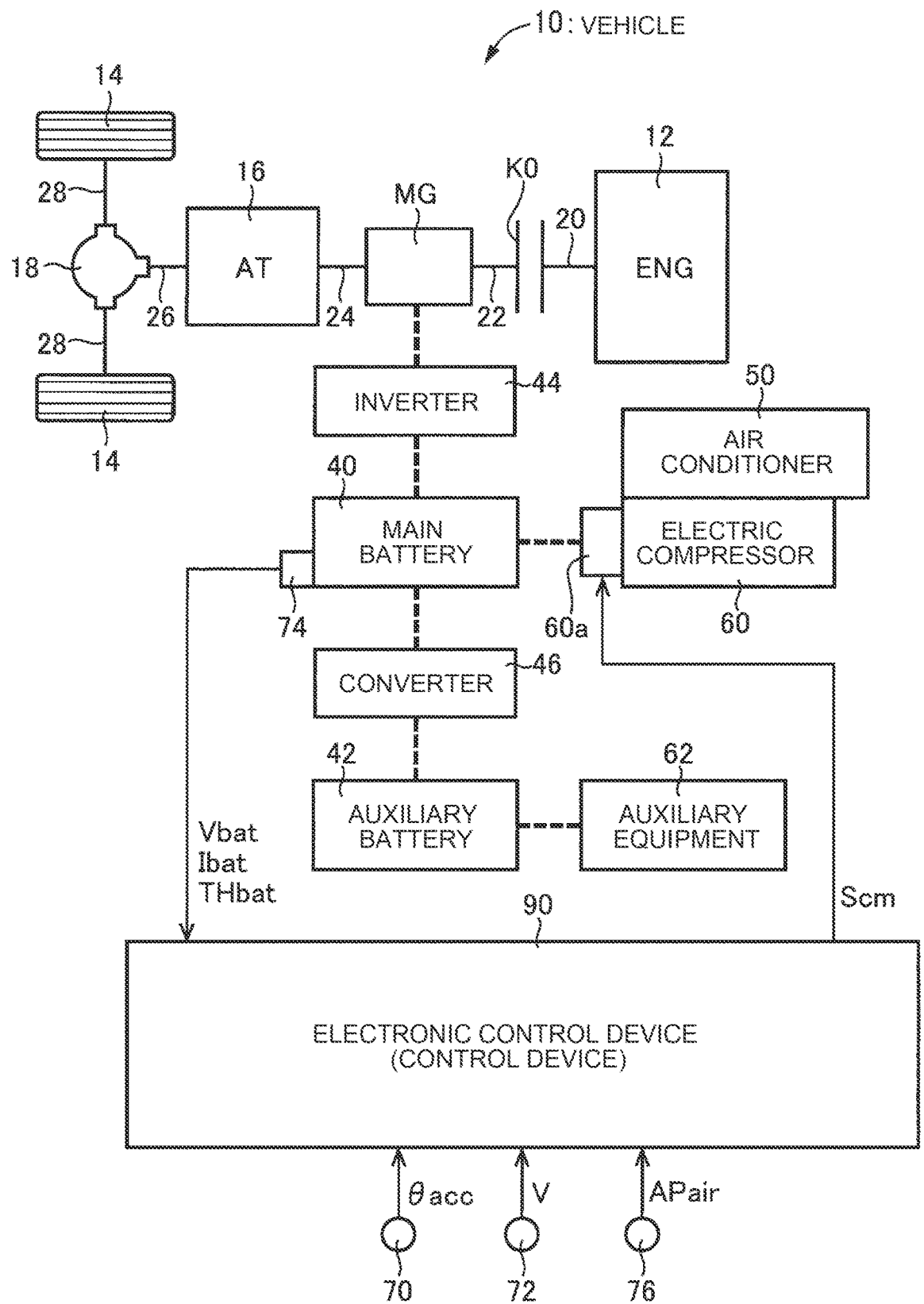
FIG. 1 is a schematic configuration diagram of a vehicle equipped with an electronic control device according to a first embodiment.

FIG. 1 is a schematic configuration diagram of a vehicle 10 on which an electronic control device 90 according to a first embodiment is mounted.

The vehicle 10 is a hybrid electric vehicle including an engine 12 as a power source and a motor MG. The clutch K0 connects and disconnects the engine 12, which is a power source, and the motor MG. In the vehicle 10, the transmission input shaft 24, the automatic transmission 16, the transmission output shaft 26, the differential 18, and the axle 28 are connected in this order from the power source side in the power transmission path between the power source and the drive wheels 14, and all of these components are well known in the art. The vehicle 10 includes a main battery 40, an auxiliary battery 42, an inverter 44, a converter 46, an air conditioner 50, an auxiliary machine 62, and an electronic control device 90.

The engine 12 is a well-known internal combustion engine. The motor MG is, for example, a rotating electric machine having a motor function and a generator function, and is a so-called motor generator. Note that the motor MG corresponds to a "rotary electric machine" in the present disclosure.

The clutch K0 is a clutch that connects and disconnects power transmission between the engine 12 and the motor MG, and is, for example, a dry-type frictional engagement device. One of the clutch K0 is connected to the crankshaft 20 of the engine 12, and the other of the clutch K0 is connected to the rotor shaft 22 of the motor MG. For example, the engine 12 is started by the motor MG outputting the cranking torque of the engine 12 in accordance with the switching from the disengaged state of the clutch K0 to the fully engaged state through the semi-engaged state.

The automatic transmission 16 is a known transmission that shifts the rotation of the transmission input shaft 24 and outputs it from the transmission output shaft 26. The transmission input shaft 24 is connected to the rotor shaft 22 so as not to be relatively rotatable.

The main battery 40 is, for example, a rechargeable secondary battery such as a lithium-ion battery or a nickel-hydrogen battery. The main battery 40 supplies, for example, electric power for driving the motor MG and electric power for charging the auxiliary battery 42. The main battery 40 is charged by, for example, electric power generated by a motor MG. The main battery 40 is a high-voltage battery having a higher charging voltage than the auxiliary battery 42. The main battery 40 corresponds to a "battery" in the present disclosure.

The inverter 44 is a well-known power supply circuit provided between the motor MG and the main battery 40, and is controlled by the electronic control device 90 to convert a direct current into an alternating current or convert an alternating current into a direct current. MG torque Tmg [Nm], which is the output torque of the motor MG, is controlled by the inverters 44.

The auxiliary battery 42 is, for example, a rechargeable secondary battery such as a lead storage battery. The auxiliary battery 42 is a low-voltage battery having a charge voltage lower than that of the main battery 40. For example, the auxiliary battery 42 is 12 [V] while the main battery 40 is at a higher voltage. The auxiliary battery 42 is charged by electric power supplied from the main battery 40 via the converter 46. The converter 46 is a well-known power supply circuit that is provided in an electric path between the main battery 40 and the auxiliary battery 42, and boosts or lowers the direct current.

The auxiliary machine 62 includes an ignition device and a fuel injection device of the engine 12 for operating the engine 12, and broadly includes an electronic control device 90 for controlling the operation of the engine 12. The auxiliary machine 62 is operated by electric power supplied from the auxiliary battery 42. That is, the auxiliary machine 62 serves as an electrical load to the auxiliary battery 42.

The air conditioner 50 adjusts the temperature and humidity of the air in the vehicle cabin. The air conditioner 50 is operated by an electric compressor 60. The electric compressor 60 is a well-known electric pneumatic compressor driven by a compressor motor 60$a$. The cooling capacity of the air conditioner 50 is controlled by controlling the rotational velocity Nemt [rpm] and the output-torque Temt [Nm] of the compressor motor 60$a$ by the electronic control device 90. The cooling capacity is expressed by, for example, the power consumption Pcmp [kWh] of the compressor motor 60$a$ that drives the air conditioner 50. The amount of heat that the air conditioner 50 removes from the vehicle cabin per unit time is determined in accordance with power consumption Pcmp. The compressor motor 60$a$ is operated by electric power supplied from the main battery 40. That is, the compressor motor 60$a$ is an electric load to the main battery 40. The power consumption Pomp is an agreement with the cooling capacity of the air conditioner 50, and corresponds to the "air conditioning capacity" in the present disclosure.

In the vehicle 10, for example, a motor running mode in which the motor MG is used as the power source without using the engine 12 as the power source and an engine running mode in which the engine 12 is used as the power source are selected as the running mode.

The electronic control device 90 includes, for example, a so-called microcomputer including a CPU, RAM, ROM, an input/output interface, and the like. CPU performs various kinds of control of the vehicles 10 by performing signal-processing in accordance with a program stored in ROM in advance while using a temporary storage function of RAM. For example, the electronic control device 90 performs operation control of the engine 12, drive control of a motor MG including regeneration control of the motor MG, shift control of the automatic transmission 16, engagement and disengagement control of the clutch K0, and the like, and controls the entire vehicle 10 as needed. Note that the electronic control device 90 corresponds to a "control device" in the present disclosure.

Various signals based on detection values by various sensors provided in the vehicle 10 are input to the electronic control device 90. Examples of the various sensors include an accelerator operation amount sensor 70, a vehicle speed sensor 72, a main battery sensor 74, and an atmospheric pressure sensor 76. The various types of signals include, for example, an accelerator opening θacc [%], which is an accelerator operation amount of the driver indicating the magnitude of the acceleration operation of the driver, a vehicle speed V [km/h], a battery temperature THbat [° C.] of the main battery 40, a battery charge/discharge current Ibat [A], a battery voltage Vbat [V], and an atmospheric pressure Apair [Pa] around the vehicle 10.

Various command signals are output from the electronic control device 90 to each device provided in the vehicle 10. The devices are, for example, the compressor motor 60$a$ for a compressor that drives the electric compressor 60. The various command signals are, for example, a control signal Scm for driving and controlling the compressor motor 60$a$.

Next, a control function of the electronic control device 90 when the vehicle 10 is running on the engine and the motor MG is driven to rotate by the engine 12 to generate electric power will be described.

For example, by applying the actual accelerator operation amount θacc and the vehicle speed V to the required driving amount map, the electronic control device 90 calculates a required driving amount (for example, required driving torque Trdem [Nm]) for the vehicle 10 by the driver. The required driving amount map is a map in which the relationship between the accelerator operation amount face and the vehicle speed V and the required driving amount is stored in advance experimentally or designedly. The required driving amount is a driving amount required for the vehicles 10, and is, for example, a required driving torque Trdem. The required driving torque Trdem is the required driving power Prdem [W] at the vehicle speed V at that time.

The required driving force Frdem [N] or the like of the drive wheels 14 may be used as the required driving force. As described above, the required driving torque Trdem, the required driving power Prdem, and the required driving force Frdem are the required driving amounts of the vehicles 10.

The electronic control device 90 controls the engine torque Te [Nm] which is the output torque of the engine 12 and MG torque Tmg which is the output torque of the motor MG so as to realize the drive requirement for the vehicle 10 during the engine running. When the motor MG is rotationally driven by the engine 12 to generate electric power, MG torque Tmg is negative torque (=reaction torque), but the engine torque Te realizes a required drive quantity and is capable of rotationally driving the motor MG. When the state-of-charge value SOC of the main battery 40 (the ratio of the actually stored charge amount to the predetermined full charge capacity) is equal to or greater than the determination value SOC_jdg3, which will be described later, the electronic control device 90 controls the engine torque Te and MG torque Tmg so as to realize the required drive amount, that is, to prioritize the securing of the traveling drive force, rather than the power generation in the motor MG. When the voltage of the auxiliary battery 42 drops below a predetermined voltage so that the engine 12 operates normally, the electronic control device 90 controls the auxiliary battery 42 to be charged from the main battery 40 via the converter 46. The predetermined voltage is an experimental or design predetermined voltage at which the auxiliary battery 42 can supply power to the auxiliary machine 62 so that the engine 12 operates normally.

The electronic control device 90 determines whether or not the vehicle 10 is in a predetermined high ground environment. The predetermined high-altitude environment is an environment that is experimentally or designedly predetermined when the power of the engine 12 is reduced due to the low-air-density of the atmosphere around the vehicle 10, and when the cooling capacity of the air conditioner 50 is not limited, the traveling drive force and the charge of the main battery 40 by the power generation in the motor MG cannot be achieved at the same time. That is, in a predetermined high-altitude environment, if the traveling drive force is secured when the cooling capacity of the air conditioner 50 is not limited, the main battery 40 is not sufficiently charged by, for example, electric power generation in the motor MG. Therefore, the decreasing rate Vdec [%/sec] of the state-of-charge value SOC of the main battery 40 may be outside a predetermined allowable range. Whether or not it is a predetermined high-altitude environment is determined based on, for example, whether or not the atmospheric pressure APair is less than the determination pressure APair_jdg. The determination pressure APair_jdg is a determination value determined experimentally or designedly in order to determine whether or not it is a predetermined high-altitude environment.

The electronic control device 90 calculates the state-of-charge value SOC [%] of the main battery 40, for example, based on the battery charge/discharge current Ibat. The electronic control device 90 determines whether or not the state-of-charge value SOC is less than the determination value SOC_jdg1 and whether or not the state-of-charge value SOC is less than the determination value SOC_jdg2. The determination value SOC_jdg2 is lower than the determination value SOC_jdg1. The determination value SOC_jdg1 is an experimentally or designedly predetermined determination value for limiting the cooling capacity of the air conditioner 50 in order to secure the traveling drive force.

The determination value SOC_jdg2 is an experimentally or designedly predetermined determination value for stopping the operation of the air conditioner 50 in order to secure the traveling drive force. The determination value SOC_jdg1 and the determination value SOC_jdg2 correspond to the "predetermined first threshold value" and the "predetermined second threshold value" in the present disclosure, respectively.

The electronic control device 90 does not limit the cooling capacity of the air conditioner 50 when the state-of-charge value SOC is equal to or greater than the determination value SOC_jdg1 in a case where the vehicle 10 is in a predetermined high-ground environment while the vehicle is running (hereinafter, referred to as "running in a high-ground environment"). The electronic control device 90 stops the operation of the air conditioner 50 when the state-of-charge value SOC is less than the determination value SOC_jdg2 during traveling in a high-altitude environment. When the state-of-charge value SOC is less than the determination value SOC_jdg1 and is greater than or equal to the determination value SOC_jdg2 during traveling in a high-altitude environment, the electronic control device 90 limits the power consumption amount Pcmp of the compressor motor 60a to less than the predetermined amount Pcmp_lmt. The predetermined amount Pcmp_lmt is a value determined experimentally or designedly in order to suppress a decrease in the comfort of the vehicle cabin while securing the traveling drive force in accordance with the state-of-charge value SOC of the main battery 40. The predetermined amount Pcmp_lmt corresponds to a "predetermined amount" in the present disclosure. Further, by limiting power consumption Pcmp of the compressor motor 60a to less than the predetermined amount Pcmp_lmt, the traveling drive force is secured in a predetermined high-ground environment. At the same time, the reduction rate Vdec of the state-of-charge value SOC of the main battery 40 becomes within a predetermined allowable range by charging the main battery 40 by power generation in the motor MG.

Note that, in a case where the vehicle is traveling in a high ground environment and the state-of-charge value SOC is less than the determination value SOC_jdg1 and further is less than the determination value SOC_jdg2, if the cooling capacity of the air conditioner 50 is not limited, the reduction rate Vdec of the state-of-charge value SOC of the main battery 40 is not suppressed as compared with a case where the cooling capacity of the air conditioner 50 is limited or the operation is stopped. This may lead to a situation in which the power performance of the vehicle 10 is inevitably deteriorated. The situation in which the power performance must be deteriorated is, for example, a situation in which, in order to normally operate the auxiliary machine 62, the power generation in the motor MG is prioritized, and the required drive quantity cannot be realized, that is, the traveling drive force cannot be secured.

In the electronic control device 90, for example, when the state-of-charge value SOC is less than the determination value SOC_jdg3 (≤SOC_jdg2) during traveling in a high-altitude environment, the operation of the air conditioner 50 is stopped. However, the electronic control device 90 prioritizes power generation in the motor MG rather than securing the traveling drive force in order to operate the auxiliary machine 62 normally. The determination value SOC_jdg3 is a determination value determined experimentally or designedly in advance in order to prioritize power generation in the motor MG over securing the traveling drive force while the operation of the air conditioner 50 is stopped. Thus, although the required driving amount is not realized, the state in which the main battery 40 can travel is maintained by suppressing a decrease in the state-of-charge value SOC as compared with a case where the securing of the traveling drive force is prioritized over the power generation in the motor MG.

Preferably, when the state-of-charge value SOC is less than the determination value SOC_jdg1 and is equal to or greater than the determination value SOC_jdg2, the predetermined amount Pcmp_lmt is set low in accordance with the state-of-charge value SOC decreasing.

Figure 2:
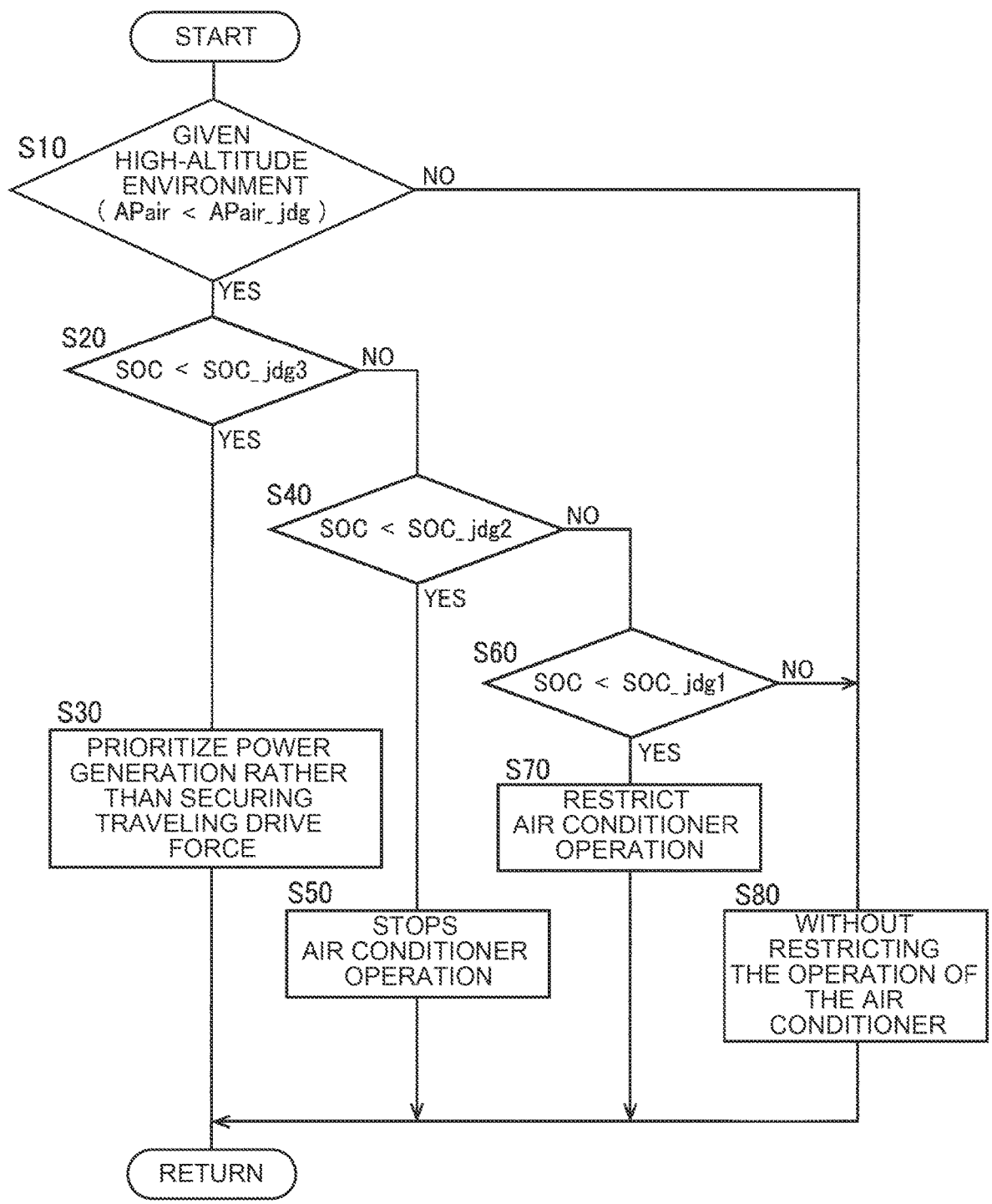
FIG. 2 is an example of a flowchart illustrating a control operation of the electronic control device shown in FIG. 1.

FIG. 2 is an example of a flowchart illustrating a control operation of the electronic control device 90 illustrated in FIG. 1. The flowchart of FIG. 2 is repeatedly executed while the engine is running.

First, in S10, it is determined whether or not the vehicles 10 are in a predetermined high-altitude environment. If the determination of S10 is affirmative, it is determined in S20 whether or not the state-of-charge value SOC is less than the determination value SOC_jdg3. When the determination of S20 is affirmative, power generation in the motor MG is prioritized over securing the traveling drive force in S30. If the determination of S20 is negative, it is determined in S40 whether or not the state-of-charge value SOC is less than the determination value SOC_jdg2. When the determination of S40 is affirmative, the operation of the air conditioner 50 is stopped in S50. If the determination of S40 is negative, it is determined in S60 whether or not the state-of-charge value SOC is less than the determination value SOC_jdg1. When the determination of S60 is affirmative, in S70, the power consumption Pcmp of the compressor motor 60a is limited to less than the predetermined amount Pcmp_lmt, that is, the cooling capacity of the air conditioner 50 is limited. When the determination of S10 is negative and the determination of S60 is negative, the cooling capacity of the air conditioner 50 is not limited in S80. After S30, S50, S70 and S80 are performed, the returns are made. In S50, S70 and S80, securing of the traveling drive force is prioritized over power generation in the motor MG.

According to the present embodiment, in the case where the securing of the traveling drive force is prioritized over the electric power generation in the motor MG and the vehicle 10 is in the predetermined high ground environment during the engine running, when (a) the state-of-charge value SOC of the main battery 40 charged by the electric power generated by the motor MG is less than the determination value SOC_idg1, the power consumption Pomp of the compressor motor 60a for the compressor is limited to less than the predetermined amount Pcmp_lmt, (b) when the state-of-charge value SOC is less than the determination value SOC_jdg2 lower than the determination value SOC_jdg1, the operation of the air conditioner 50 is stopped, and (c) when the state-of-charge value SOC is equal to or greater than the determination value SOC_jdg1, the cooling capacity of the air conditioner 50 is not limited. When the state-of-charge value SOC of the main battery 40 is high in a high-altitude environment, the cooling capacity of the air conditioner 50 is not limited. On the other hand, when the state-of-charge value SOC of the main battery 40 is low, the cooling capacity of the air conditioner 50 is limited or the operation is stopped. As described above, since the cooling capacity of the air conditioner 50 is limited or the operation is stopped only when the traveling drive force is secured and necessary, deterioration of the power performance is suppressed and deterioration of the comfort in the vehicle cabin is suppressed.

According to the present embodiment, when the state-of-charge value SOC is less than the determination value SOC_jdg1 and is equal to or greater than the determination value SOC_jdg2, the predetermined amount Pcmp_lmt is set low in accordance with the state-of-charge value SOC decreasing. When the state-of-charge value SOC is less than the determination value SOC_jdg1 and is equal to or greater than the determination value SOC_jdg2, the predetermined amount Pcmp_lmt is set to be lower as the state-of-charge value SOC decreases compared with the case where the predetermined amount Pcmp_lmt is a constant value, so that it is possible to keep the decrease in the comfort in the vehicle cabin in accordance with the state-of-charge value SOC.

According to the present embodiment, the air conditioner 50 is operated by the operation of the electric compressor 60 using the electric power stored in the main battery 40, and the cooling capacity is limited by limiting power consumption Pcmp of the electric compressor 60. Since power consumption Pcmp of the electric compressor 60 is limited, Vdec in the rate of reduction of the state-of-charge value SOC of the main battery 40 is suppressed, so that a decrease in power performance is suppressed and a decrease in comfort in the vehicle cabin is suppressed.

Example 2

Figure 3:
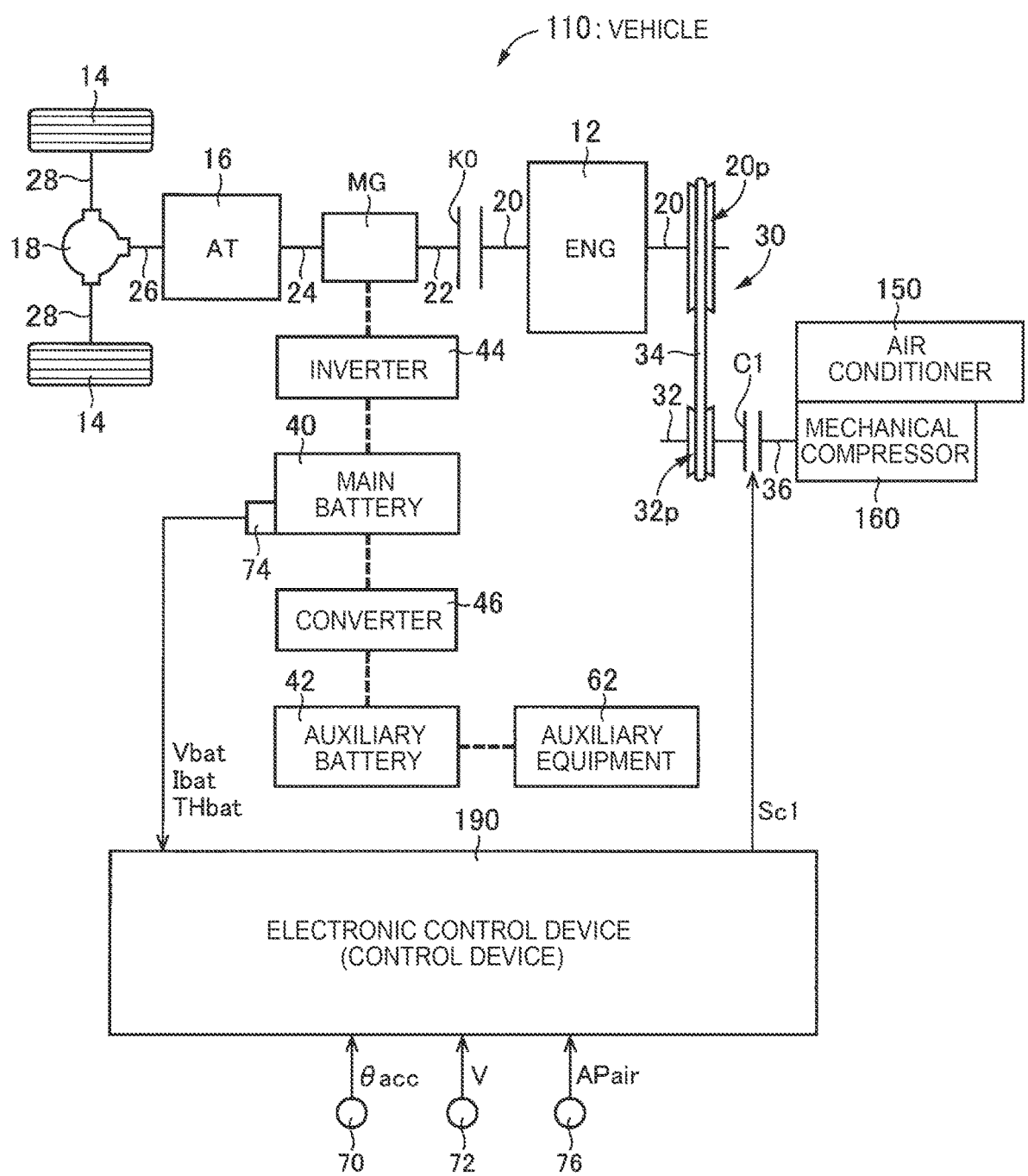
FIG. 3 is a schematic configuration diagram of a vehicle in which the electronic control device according to the second embodiment is mounted.

FIG. 3 is a schematic configuration diagram of a vehicle 110 on which the electronic control device 190 according to the second embodiment is mounted. The configuration of the vehicle 110 according to the present embodiment is substantially the same as the configuration of the vehicle 10 according to the first embodiment described above, but in the vehicle 10, the air conditioner 50 is operated by the electric compressor 60, but in the vehicle 110, the air conditioner 150 is operated by the mechanical compressor 160. Therefore, in the present embodiment, portions different from those of the first embodiment will be mainly described, and portions substantially common to those of the first embodiment will be denoted by the same reference numerals, and description thereof will be omitted as appropriate.

In the vehicle 110, instead of the air conditioner 50, the electric compressor 60, and the electronic control device 90 in the vehicle 10 described above, the air conditioner 150, the mechanical compressor 160, and the electronic control device 190 are provided, respectively.

The air conditioner 150 is identical to the configuration of the air conditioner 50 except that it is actuated by a mechanical compressor 160.

The mechanical compressor 160 is a well-known mechanical air compressor driven using the power of the engine 12. The engine 12 and the mechanical compressor 160 can be connected to each other via a belt transfer device 30 and an electromagnetic-clutch C1. The belt transfer device 30 is a known belt-type transmission device including a crank pulley 20p connected to the crankshaft 20 of the engine 12 so as not to be relatively rotatable, a compressor pulley 32p connected to the intermediate transmission shaft 32 so as not to be relatively rotatable, and a belt 34 wound between the crank pulley 20p and the compressor pulley 32p. The electromagnetic clutch C1 is a known electromagnetic clutch that can be disconnected between the intermediate transmission shaft 32 and the input shaft 36 of the mechanical compressor 160.

When the electromagnetic-clutch C1 is connected, the mechanical compressor 160 is activated using the power of the engine 12. When the electromagnetic-clutch C1 is disconnected, the mechanical compressor 160 is deactivated.

For example, the electronic control device 190 controls duty ratio α [%] (=the total time of the connection time/the connection time and the disconnection time) in the connection/disconnection control of the electromagnetic-clutch C1, so that the operation state of the mechanical compressor 160 is controlled and the cooling capacity of the air conditioner 150 is made variable.

Since the operating condition of the mechanical compressor 160 also varies depending on the rotational speed Ne [rpm] of the engine 12, for example, in order to limit the cooling capacity of the air conditioner 150, the relation between the rotational speed Ne of the engine 12 and the cooling capacity of the air conditioner 150 and duty ratio a is controlled experimentally or designedly using a predetermined map. The mechanical compressor 160 that drives the air conditioner 150 provides a mechanical load (=load torque) to the engine 12. Since the mechanical loads of the mechanical compressor 160 reduce the generated electric power in the motor MG, the mechanical loads can also be considered as the amount of decrease in the generated electric power in the motor MG [kWh]. Duty ratio α is an agreement with the cooling capacity of the air conditioner 150 and corresponds to the "air conditioning capacity" in the present disclosure because it can be regarded as a reduction in the electric power generated by the mechanical loads of the mechanical compressor 160, that is, the motor MG.

The electronic control device 190 is substantially the same as the configuration of the electronic control device 90 in the first embodiment described above, but differs in the following points. In the electronic control device 90 of the first embodiment, a control signal Scm for driving and controlling the compressor motor 60a is output, but in the electronic control device 190, a control signal Sc 1 for controlling the connection and disconnection of the electromagnetic-clutch C1 is output. The control function of the electronic control device 190 differs from that of the electronic control device 90 in that the connection/disconnection control of the electromagnetic-clutch C1 is performed in order to limit the cooling capacity of the air conditioner 150 or to stop the operation. Note that the electronic control device 190 corresponds to a "control device" in the present disclosure.

When the state-of-charge value SOC is less than the determination value SOC_jdg1 and is greater than or equal to the determination value SOC_jdg2 during traveling in a high-altitude environment, the electronic control device 190 limits duty ratio α to less than the predetermined value α_lmt. The predetermined value α_lmt is an experimentally or designedly predetermined value and corresponds to a "predetermined amount" in the present disclosure so that a decrease in comfort in the vehicle cabin can be suppressed while securing the traveling drive force in accordance with the state-of-charge value SOC of the main battery 40. When the state-of-charge value SOC is less than the determination value SOC_jdg2 during traveling in a high-altitude environment, the electronic control device 190 sets the electromagnetic-clutch C1 to the release state (=duty ratio α is 0 [%]) and stops the operation of the air conditioner 150.

According to the present embodiment, by having the same configuration as that of the above-described first embodiment, the same effects as those of the first embodiment can be obtained.

According to the present embodiment, the air conditioner 150 is operated by the operation of the mechanical compressor 160 connected to the engine 12, and the cooling capacity is limited by limiting the drive load of the mechanical compressor 160 with respect to the engine 12. Since the drive load of the mechanical compressor 160 is limited, the power of the engine 12 can be used for traveling drive force or power generation in the motor MG by an amount corresponding to the limit of the drive load, so that Vdec in the reduction rate of the state-of-charge value SOC of the main battery 40 is suppressed. Therefore, a decrease in power performance is suppressed, and a decrease in comfort in the vehicle cabin is suppressed.

Although the embodiments of the present disclosure have been described in detail with reference to the drawings, the present disclosure is also applied to other aspects.

In Embodiments 1 and 2 described above, the "rotary electric machine" in the present disclosure is a motor MG having a motor function, but may be a rotating electric machine that does not have a motor function as long as it has a generator function. In such an embodiment, for example, the engine 12 is started by a starter motor.

In the first and second embodiments described above, the vehicle 10,110 is a hybrid electric vehicle that includes a clutch K0 that disconnects the engine 12, which is a power source, from the motor MG and transmits the power outputted from the power source to the drive wheels 14, but the vehicle to which the present disclosure is applied is not limited thereto. The present disclosure is applicable to a vehicle having a "rotary electric machine" that is driven by the engine 12 and the engine 12 thereof to generate electric power, and that is capable of running the engine using the engine 12 as a power source.

In the first and second embodiments described above, when the state-of-charge value SOC is less than the determination value SOC_jdg3 (≤SOC_jdg2) during traveling in a high-altitude environment, power generation in the motor MG is prioritized over securing the traveling drive force, but the present disclosure is not limited to this embodiment. For example, when the state-of-charge value SOC is less than the determination value SOC_jdg2 during traveling in a high-altitude environment, the operation of the air conditioner 50, 150 may be stopped and the power generation in the motor MG may be prioritized over the securing of the traveling drive force. In this embodiment, S20 and S30 in the flow chart of FIG. 2 are omitted, and S40 is executed after S10 is executed.

In the first and second embodiments described above, although the "air conditioning capacity" is exemplified as the "air-conditioning capacity" in the present disclosure, the present disclosure is not limited thereto, and may be a "heating capacity" or a "dehumidifying capacity". The heating capacity and the dehumidifying capacity of the air conditioner 50, 150 are, for example, the power consumption Pcmp of the compressor motor 60a that drives the air conditioner 50, and the amount of heat taken into the vehicle cabin by the air conditioner 50 and the amount of water to be removed per unit time are determined in accordance with the power consumption Pcmp.

In the first and second embodiments described above, whether the vehicle 10, 110 is in a predetermined high-altitude environment is determined based on the atmospheric pressure APair around the vehicle 10, 110, but the present disclosure is not limited thereto. For example, when the altitude of the location where the vehicle 10, 110 is traveling can be identified based on the car navigation device including information on latitude, longitude, and altitude, and the own-vehicle position information indicating the position of the vehicle 10, 110 on the ground surface or the map based on GPS signals (orbit signals) transmitted by Global Positioning System (GPS) satellites, it may be determined whether or not the vehicle is in a predetermined altitude based on the altitude.

It is to be noted that the above-described embodiments are merely examples of the present disclosure, and the present disclosure can be implemented in various modifications and improvements based on the knowledge of a person skilled in the art without departing from the gist of the present disclosure.

What is claimed is:

1. A control device for a vehicle including an engine, a motor generator that is rotationally driven by the engine and that generates electric power, a battery charged by the electric power generated by the motor generator; an air conditioner, and a global positioning system (GPS) sensor, the control device comprising a processor configured to:
   acquire information indicating a position and an altitude of the vehicle from the GPS sensor;
   determine whether the altitude of the vehicle is above a threshold altitude;
   in a case where the altitude of the vehicle is above the threshold altitude, acquire information indicating a state of charge of the battery;
   determine whether the state of charge of the battery is less than a first threshold value;
   in a case where the state of charge of the battery is less than the first threshold value, limit an air conditioning capacity of the air conditioner to less than a predetermined amount;
   in a case where the state of charge of the battery is less than a second threshold value that is lower than the first threshold value, stop the air conditioner; and
   in a case where the state of charge of the battery is equal to or greater than the first threshold value, not to limit the air conditioning capacity of the air conditioner.

2. The control device according to claim 1, wherein the processor is configured to set the predetermined amount lower as the state of charge of the battery decreases in a case where the state of charge of the battery is less than the first threshold value and is greater than or equal to the second threshold value.

3. The control device according to claim 1, wherein
   the vehicle further includes an electric compressor,
   the air conditioner is operated by the electric compressor using electric power stored in the battery, and
   the processor is configured to limit the air conditioning capacity by limiting power consumption of the electric compressor.

4. The control device according to claim 1, wherein
   the vehicle further includes a mechanical compressor that is coupled with the engine, and
   the air conditioner is operated by the mechanical compressor, and
   the processor is configured to limit the air conditioning capacity by limiting a drive load on the engine from the mechanical compressor.

5. The control device according to claim 1, wherein the processor is configured to acquire a discharge current information indicating a current that is discharged from the battery, and
   calculate the state of charge of the battery based on the discharge current information.

6. The control device according to claim 1, wherein the battery is a lithium-ion battery configured to be chargeable and dischargeable.

7. A control device for a vehicle including an engine, a motor generator that is rotationally driven by the engine and that generates electric power, a battery charged by the electric power generated by the motor generator; a global positioning system (GPS) sensor, and a mechanical compressor that is coupled with the engine via an electromagnetic clutch, and an air conditioner operated by the mechanical compressor, the control device comprising a processor configured to:
   acquire information indicating a position and an altitude of the vehicle from the GPS sensor;
   determine whether the altitude of the vehicle is above a threshold altitude;
   in a case where the altitude of the vehicle is above the threshold altitude, acquire information indicating a state of charge of the battery;
determine whether the state of charge of the battery is less than a first threshold value;
   in a case where the state of charge of the battery is less than the first threshold value, limit an air conditioning capacity of the air conditioner to less than a predetermined amount by limiting a drive load on the engine from the mechanical compressor;
   in a case where the state of charge of the battery is less than a second threshold value that is lower than the first threshold value, stop the air conditioner by deactivating the mechanical compressor by disengaging the electromagnetic clutch and disconnecting the engine from the mechanical compressor; and
   in a case where the state of charge of the battery is equal to or greater than the first threshold value, not to limit the air conditioning capacity of the air conditioner.

* * * * *